Patented Mar. 28, 1950

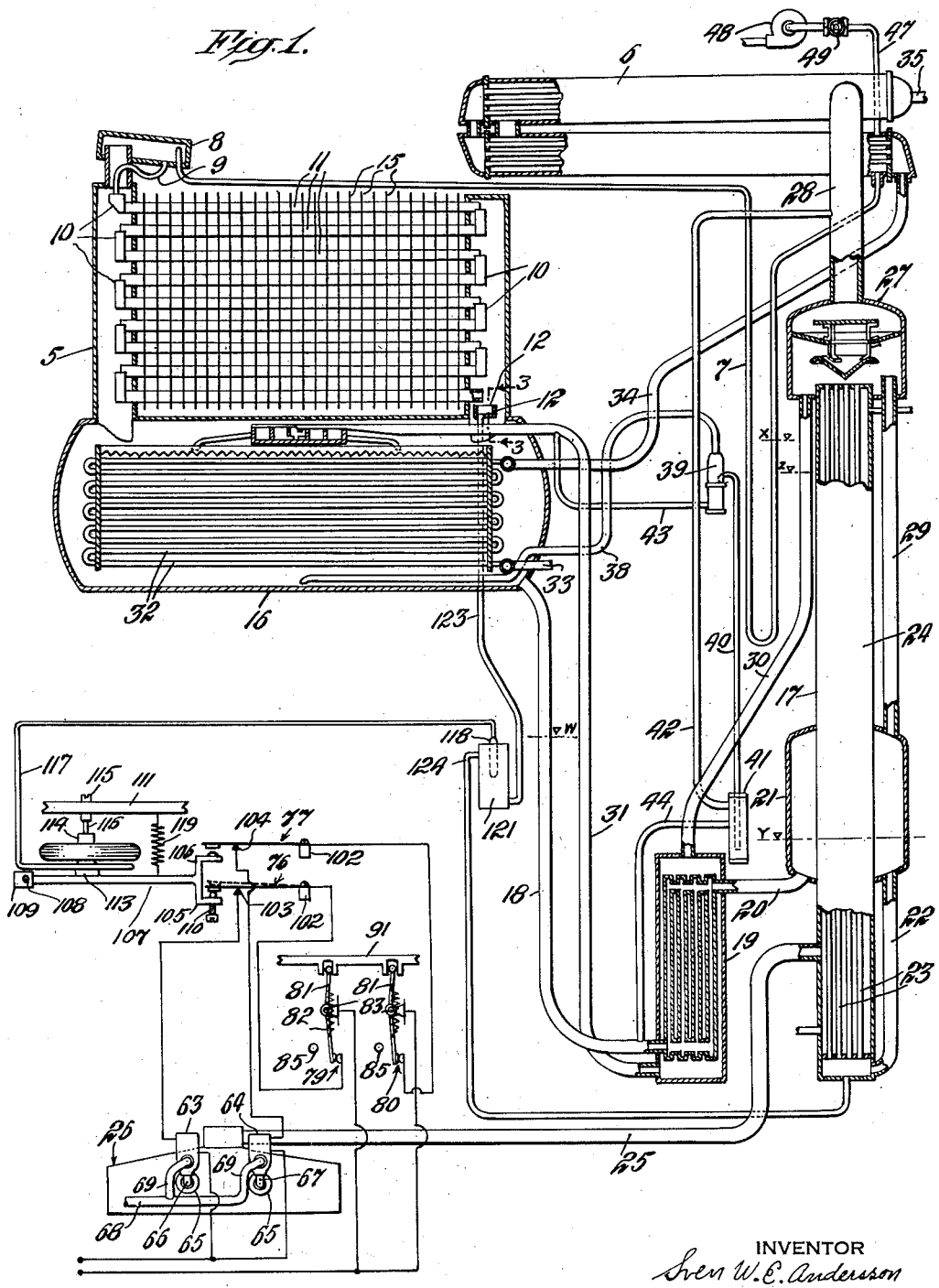

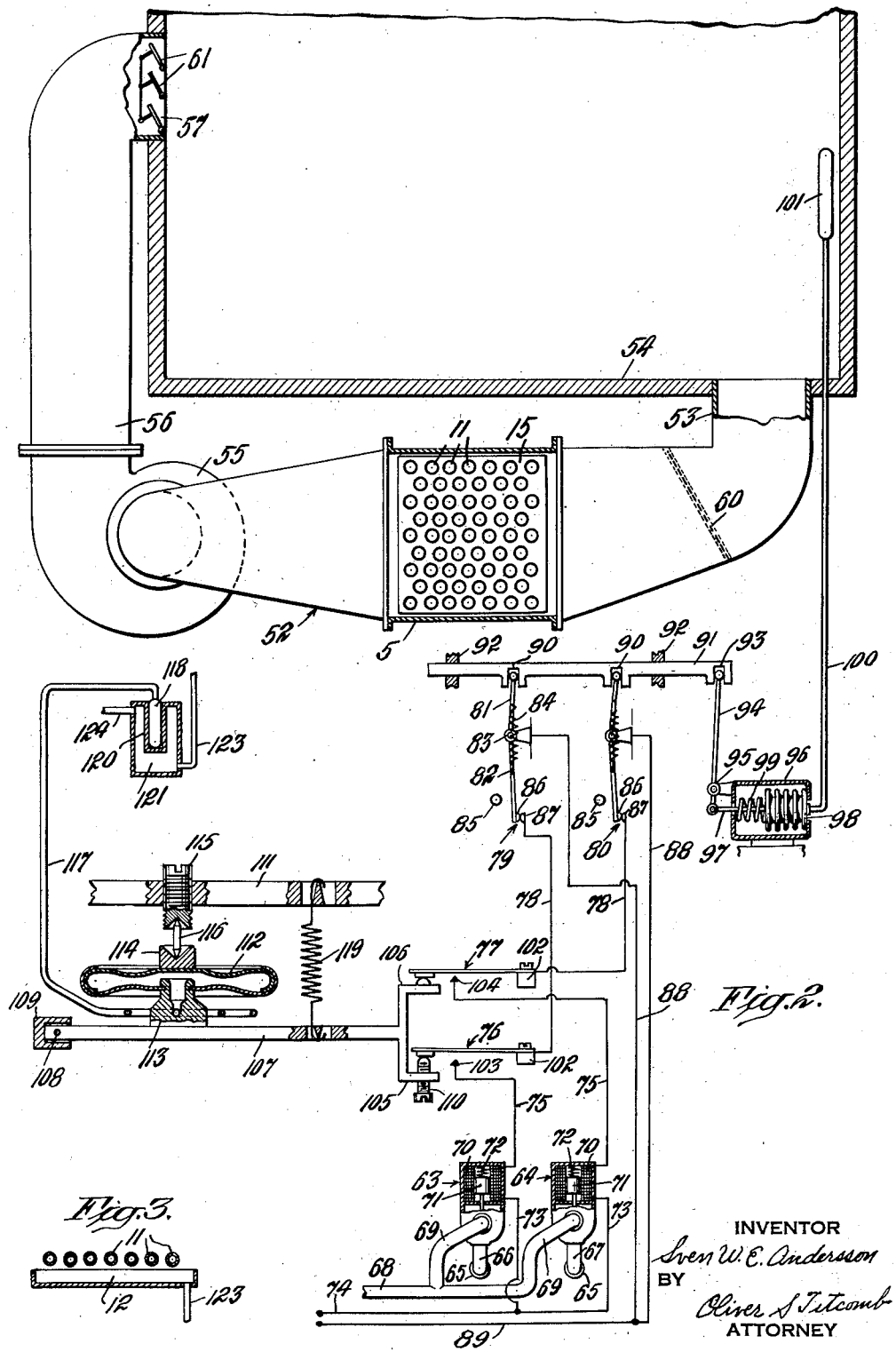

2,502,069

UNITED STATES PATENT OFFICE 2,502,069

CONTROL FOR REFRIGERATION

Sven W. E. Andersson, Evansville, Ind., assignor to Servel, Inc., New York, N. Y., a corporation of Delaware Application January 11, 1944, Serial No. 517,789

21 Claims. (Cl. 62—5)

The present invention relates to continuous absorption refrigeration systems and more particularly to a control for regulating the rate of flow of refrigerant through the system in accordance with the requirements in the evaporator.

While the control of the present invention may be applied to other refrigeration systems it is particularly adapted for use with an absorption refrigeration system of the type illustrated and described in the United States Letters Patent to Albert R. Thomas et al. No. 2,282,504, issued May 12, 1942, entitled Refrigeration. The refrigeration system illustrated in the Thomas et al. patent operates in a partial vacuum and utilizes water as a refrigerant and a saline solution as an absorbent. In such a system the evaporator is so constructed as to divide the liquid refrigerant into shallow streams which flow in tortuous paths therethrough to promote evaporation. However, if insufficient heat is transferred to the liquid refrigerant in the evaporator to cause complete vaporization, liquid refrigerant will overflow into the absorber which constitutes an unnecessary loss. Furthermore, if the absorption capacity corresponds to the amount of refrigerant supplied to the evaporator and insufficient heat is transmitted to evaporate all of the refrigerant in the evaporator, the pressure and temperature therein will gradually drop until the temperature is below the freezing point of the refrigerant.

One of the objects of the present invention is to provide a control responsive to the occurrence of unevaporated liquid refrigerant overflowing from the evaporator for reducing the rate of flow of refrigerant through the system.

Another object is to provide a control of the type indicated responsive to a drop in the temperature of the unevaporated liquid refrigerant overflowing from the evaporator for progressively decreasing the rate of flow of refrigerant through the system.

Another object is to provide a control of the type indicated which is operative to reduce the heat supplied to the generator when unevaporated liquid refrigerant overflows from the evaporator and to cut off the supply of heat to the generator when freezing of the refrigerant is about to occur.

Another object is to provide a control of the type indicated having a thermostat responsive to the temperature of unevaporated liquid refrigerant overflowing from the evaporator and mechanism operated by the thermostat for successively operating switches of an electric circuit.

Another object is to provide a control of the type indicated arranged to operate in conjunction with an electrical control circuit responsive to the ambient to be cooled.

Still another object of the present invention is to provide a control of the type indicated which is of simple and compact construction and one which is positive in its operation to control the rate of flow of refrigerant through the system.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

Fig. 1 is a diagrammatic view of an absorption refrigeration system incorporating the novel control of the present invention and showing the relationship of the parts at full load without overflow of refrigerant from the evaporator;

Fig. 2 is a diagrammatic view showing the absorption refrigeration system applied to use in an air conditioner and illustrating the control as operated to shut off the supply of heat to the generator, and Fig. 3 is a transverse sectional view taken on line 3—3 of Fig. 1 showing the drain trough for receiving unevaporated liquid refrigerant overflowing from the evaporator.

Referring to the drawings the control of the present invention is shown applied to an absorption refrigeration system generally similar to that illustrated in the Thomas et al. patent, referred to above, comprising a cooling element or evaporator 5 into which liquid refrigerant, such as, for example, water, is introduced from a condenser 6 through a path of flow including a U-shaped tube 7 and flash chamber 8. The liquid refrigerant flows from the flash chamber 8 through a tube 9 into a distributing trough 10 which divides it into a plurality of shallow streams and directs the streams into a plurality of generally horizontal tubes 11. The tubes 11 are inclined slightly so that the liquid refrigerant will flow therethrough by gravity and the liquid refrigerant discharged from the ends of the tubes is collected in another distributing trough 10 which again divides the liquid and directs it into the next lowermost tubes 11 of a bank of such tubes, see Fig. 2. Thus the cooling element or evaporator 5 is made up of a series of tubes 11 and distributing troughs 10 arranged in series to provide a tortuous path of flow for the refrigerant to promote evaporation as it passes through the evaporator.

The number and surface area of the tubes 11 is so proportioned as to cause complete evaporation of all of the liquid refrigerant under the most extreme load conditions as it passes through the evaporator 5. At the end of the lowermost tubes 11 of the bank of tubes is a drain trough 12 for receiving any unevaporated liquid refrigerant which may occur at the bottom of the evaporator during light load or no load conditions, see Figs. 1 and 3. The liquid refrigerant is thus evaporated in the evaporator 5 with consequent absorption of heat from the ambient such as a stream of air flowing over the exterior surface of the tubes 11 and fins 15 of the evaporator. The refrigerant vapor formed in the evaporator 5 flows to an absorber 16 in which the vapor is absorbed into a liquid absorbent, such as, for example, a solution of lithium chloride, lithium bromide, or the like.

The absorption liquid enriched with refrigerant is conducted from the absorber 16 to a generator 17 in a path of flow including a conduit 18, liquid heat exchanger 19, conduit 20, vessel 21, and conduit 22. Within the generator 17 a plurality of riser tubes 23 are enclosed within a shell 24 to form a chamber to which steam is supplied through a conduit 25 from a boiler 26. The heating of the riser tubes 23 by the steam causes refrigerant vapor to be expelled from the absorption solution and the expelled vapor is effective to raise the absorption liquid by gas or vapor-lift action.

The expelled vapor passes from the upper ends of the riser tubes 23 into a vapor separating chamber 27 having suitable baffles therein and thence flows through a conduit 28 to the condenser 6 where the vapor is liquefied. The liquid refrigerant formed in the condenser 6 flows by gravity into the U-shaped tube 7 to the upper part of the evaporator 5 as explained above to complete the refrigeration cycle. Preferably a conduit 29 connects the chamber 21 and vapor separating chamber 27 to equalize the pressure therebetween.

The raised absorption liquid from which refrigerant vapor has been expelled is conducted from the separating chamber 27 at the upper end of the generator 17 to the absorber 16 to absorb refrigerant vapor, this liquid being conducted to the absorber in a path of flow including a conduit 30, liquid heat exchanger 19 and conduit 31. The heat liberated by the absorption of refrigerant vapor in the absorber 16 is taken up by a cooling medium such as, for example, water which flows upwardly through vertically disposed banks of pipes 32 in the absorber. The cooling water is introduced into the lower ends of the banks of pipes through a conduit 33 and is discharged from the upper ends of the banks of pipes through a conduit 34. The conduit 34 is connected to the condenser 6 so that the cooling water also may be utilized to effect cooling of the condenser. The cooling water is discharged from the condenser 6 through a conduit 35.

The system operates in a partial vacuum with generator 17 and condenser 6 operating at one pressure and evaporator 5 and absorber 16 operating at a lower pressure. The pressure differential between the high and low pressure sides of the system is maintained by liquid columns in the up-leg of the U-shaped tube 7 between the condenser 6 and the evaporator 5 and in the conduits 18 and 31 connecting the absorber 16 and heat exchanger 19. The liquid level in the U-shaped tube 7 is indicated by the reference character $x$, the liquid levels in vessel 21 and conduit 18 connected thereto through the heat exchanger 19 are indicated by the reference characters $y$ and $w$, and the liquid level in the conduit 30 connected to the conduit 31 through the heat exchanger 19 is indicated by the reference character $z$.

During the operation of the refrigeration system non-condensible gases may accumulate in the various elements thereof which must be purged from the system periodically. The non-condensible gases are continuously transferred from the absorber 16 to the condenser 6 through a conduit 38, vessel 39, fall tube pump 40, separating chamber 41 and conduit 42. Absorption liquid is diverted from the conduit 31 through a conduit 43 to the vessel 39 which periodically siphons into the fall tube pump 40 and traps non-condensible gases between alternate slugs of liquid. The column of liquid slugs and non-condensible gases in the fall tube 40 maintain the pressure differential between the high and low pressure sides of the system and the absorption liquid is discharged from the separating chamber 41 through a conduit 44 to the conduit 18. The non-condensible gases are purged from the condenser 6 through a conduit 47 having one end connected to the condenser adjacent its outlet and its opposite end connected to a suitable exhaust pump 48. Preferably a control valve 49 is provided in conduit 47 for preventing the atmosphere from entering the refrigeration system when the pump is inoperative.

The evaporator 5 of the refrigeration system may be located at any suitable place to cool any desired medium. In Fig. 2 of the drawings the evaporator 5 is shown as mounted in a ventilating duct 52 for conditioning air supplied to an enclosure or room 54. One end 53 of the duct 52 is shown connected to an outlet from the enclosure or room 54 to be air conditioned and the opposite end is shown connected to a circulating fan or blower 55. A conduit 56 connected to the blower 55 extends to an inlet 57 for the enclosure or room 54. An air filter 60 is provided in the conduit 52 between evaporator 5 and the enclosure 54 and a register 61 is provided in the inlet 57 to the enclosure 54 for regulating the flow of air thereto as illustrated diagrammatically in Fig. 2.

The rate of flow of refrigerant through the refrigerating system is controlled in accordance with the requirements of the evaporator 5 to cool the air circulated through the duct 52 and enclosure 54 by the blower 55. To this end the heating of the boiler 26 is regulated by a plurality of control devices, two of such control devices 63 and 64 being illustrated in the drawings. As illustrated in Fig. 1 the boiler 26 is provided with a plurality of fire tubes 65 into which the flames from burners 66 and 67 are projected. A combustible fuel is delivered from a source of supply through conduit 68 and branch conduits 69 to the control devices 63 and 64 which, in turn, deliver the fuel to the burners 66 and 67. As shown in Fig. 2 each of the control devices 63 and 64 includes a solenoid coil 70 formed to receive a plunger 71 having a valve at its lower end for opening or closing the path of flow to its particular burner 66 or 67. When the solenoid coil 70 of each control device 63 or 64 is electrically energized the plunger 71 and valve carried thereby is raised whereby to permit fuel to flow to the burner 66 or 67. A spring 72 is provided in each of the control devices 63 and 64 which acts on the plunger 71 to move the latter and valve carried thereby to closed position to shut off the flow of fuel to the burner 66 or 67.

As shown in Fig. 2 the solenoids 70 of the control devices 63 and 64 are connected in parallel in an electrical circuit. One terminal of each coil 70 is connected by a suitable conductor 73 to one of the line conductors 74 from a suitable source of current. The opposite terminal of each solenoid 70 is connected by a conductor 75 to one or the other of two switches 76 or 77, later to be described in detail. A conductor 78 for each of the control devices 63 or 64 connects the switch 76 or 77 to a toggle switch 79 or 80 arranged in series therewith. The toggle switches 79 and 80 are of the snap acting type and each includes toggle arms 81 and 82 pivotally connected at their inner ends to a suitable support 83. Each switch 79 and 80 has an over-center coil spring 84 connected to the toggle arms 81 and 82 intermediate their ends. A stop 85 is provided at one side of each switch 79 or 80 to limit the movement of the lower toggle arm 82 in one direction and the engagement of a contact 86 at its outer end with a fixed contact 87 at the end of the conductor 78 limits the movement of the toggle arm in the opposite direction. The circuit for each control device 63 and 64 is completed by a conductor 88 connected between the pivotal support 83 and the other line conductor 89 from the source of electrical current.

The upper ends of the toggle arms 81 of the plurality of switches 79 and 80 extend into recesses 90 formed in a slide bar 91 which passes through and is mounted for longitudinal movement in suitable supports 92. One end of the slide bar 91 is formed with a recess 93 for receiving the upper end of a lever 94 pivoted intermediate its ends at 95 to a frame 96. The lower end of the lever 94 is pivotally connected to a rod 97 secured to one end of an expansible and contractable bellows 98, the opposite end of the bellows being secured to the frame 96. A spring 99 is interposed between the bellows 98 and end of the frame 96 adjacent the lever 94.

The bellows 98 is connected by a capillary tube 100 to a thermal bulb 101 located in the inclosure 54. The bellows 98, tube 100 and bulb 101 constitute an expansible fluid thermostat containing a suitable volatile fluid which increases and decreases in volume in accordance with changes of the temperature in the enclosure 54. Thus, the bellows 98 expands and contracts with changes in temperature in the enclosure 54 and these movements of the bellows are utilized to control the switches 79 and 80. The angular relationship of the arms 81 and 82 of each switch 79 and 80 is so arranged that the first movement of the bellows 98 transmitted through the lever 94 and slide bar 91 will operate the switch 79 to open the contacts 86 and 87. Subsequent movement of the slide bar 91 will then operate the toggle arm 81 of the switch 80 to open the contacts 86 and 87. The switches 79 and 80, therefore, are sequentially operated to first cause the control device 63 to shut off the fuel supply to one burner 66 and thereafter cause the control device 64 to shut off the flow of fuel to the other burner 67. The refrigeration system and control as thus far described are substantially identical with that illustrated and described in the Thomas et al. patent referred to above.

It sometimes happens that the thermostat bulb 101 will respond to a temperature condition in the enclosure 54 to supply fuel to both burners 66 and 67 to operate the system at full load while at the same time insufficient heat is being transferred to the evaporator 5 to evaporate all of the liquid refrigerant passing therethrough. Unevaporated liquid refrigerant then will overflow or drain from the evaporator 5 and due to the rapid absorption of the refrigerant vapor the pressure and temperature of the refrigerant will gradually drop. The overflow of unevaporated liquid refrigerant constitutes a waste of energy and the temperature of the refrigerant may reach a value below its freezing point.

In accordance with the present invention the control devices 63 and 64 are further regulated by the switches 76 and 77 in the electrical control circuit in accordance with the condition of the refrigerant in the evaporator 5. The switches 76 and 77 comprise resilient arms of conducting material positioned in parallel arrangement with one end rigidly connected to a suitable support 102. The resilient switch arms 76 and 77 normally engage fixed contacts 103 and 104 in the respective parallel branches of the electrical control circuit. The opposite free ends of the switch arms 76 and 77 extend beyond the fixed contact 103 and 104 and are adapted to be engaged by one or the other of the bifurcated ends 105 and 106 of an operating member 107. The end of the operating member 107 opposite the bifurcations 105 and 106 is pivoted at 108 for rocking movement on a fixed support 109. Preferably the bifurcated end 105 of the operating member 107 is provided with an adjustable abutment 110 for first engaging the end of the resilient arm of the switch 76.

Positioned between the operating member 107 and a fixed frame 111 is an expansible wafer type thermostat element 112 having an abutment 113 at one side connected to the member 107. An abutment 114 at the opposite side of the thermostat element 112 is connected to an adjustable abutment 115 on the frame 111 by means of a pin 116 having tapered ends. The thermostat element 112 is connected to a bulb 118 by means of a capillary tube 117 having one end connected to the interior of the element 112 with several coils surrounding the abutment 113 and its opposite end connected to the bulb. The bulb 118, capillary tube 117, and element 112 constitute an expansible and contractable thermostat for actuating the operating member 107 in accordance with the temperature surrounding the bulb 118. A spring 119 is connected between the operating member 107 and frame 111 for actuating the operating member in the opposite direction.

The bulb 118 of the thermostat is so arranged as to be subjected to any unevaporated liquid refrigerant overflowing from the evaporator 5. To this end the bulb 118 is located in a pocket 120 in a closed chamber 121 and the interior of the chamber is connected to the drain trough 12 in the evaporator 5 by a conduit 123 to receive any unevaporated liquid refrigerant draining or overflowing therefrom. A second conduit 124 extends between the chamber 121 and the base of the generator 17. Thus, any unevaporated liquid refrigerant occurring at the bottom of the evaporator 5 will flow through the conduit 123 and into the chamber 121 and will overflow from the chamber through the conduit 124 to the base of the generator 17. It will be apparent that when no unevaporated liquid refrigerant is flowing through the chamber 121 the bulb 118 will be comparatively warm and the volatile fluid therein will expand the thermostat element 112 against the action of the spring 119 whereby to hold the operating member 107 in the inoperative position illustrated in Fig. 1. However, when any unevaporated liquid refrigerant flows through the conduit 123 to the chamber 121 heat will flow from the bulb 118 and decrease the volume of the volatile fluid therein so as to permit contraction of the thermostat element 112 and rocking movement of the operating member 107 by the spring 119 to open the switch 76 of the circuit for the control device 63 whereby to shut off the burner 66. Should the temperature of the unevaporated liquid refrigerant flowing through the chamber 121 drop below a predetermined value the spring 119 will actuate the operating member 107 farther to open the switch 77 for the control device 64 to shut off the supply of fuel to the other burner 67. Thus, the control of the present invention is superimposed upon the normal control for regulating the flow of refrigerant through the system in accordance with requirements in the evaporator to prevent the temperature in the evaporator from falling below a predetermined value. One form of the invention having now been described in detail, the mode of operation of the device is explained as follows.

For purposes of description let it be assumed that the refrigeration system is operating; that the solenoid coils 70 of both control devices 63 and 64 are energized so that fuel is being supplied to each of the burners 66 and 67; that the blower 55 is operating to circulate air through the conduit 52 and enclosure 54 and that the control switches 76, 77, 79 and 80 are in the closed position illustrated in Fig. 1 of the drawings. Air drawn into the conduit 52 from the enclosure 54 will pass through the air filter 60 and tubes 11 and fins 15 of the evaporator 5 and then will be delivered by the blower 55 through the conduit 56 and register 61 back to the enclosure.

When the temperature in the enclosure 54 falls below a predetermined value the volume of the volatile fluid in the bulb 101 and bellows 98 will be reduced sufficiently to permit the spring 99 operating on the bellows to rock the lever 94 in counterclockwise direction to slide the bar 91 toward the left as viewed in Fig. 2. The initial movement of the bar 91 toward the left will operate on the upper toggle arm 81 of the switch 79 to move the spring 84 until it passes over the center of the pivot 83 to operate the opposite toggle arm 82 into engagement with the stop pin 85 whereby to open the contacts 86 and 87. Opening the contacts 86 and 87 will open the circuit to the solenoid coil 70 of the control device 63 whereby the spring 72 will operate to close the valve to stop the flow of fuel to burner 66. With less heat supplied to the boiler 26 less steam will flow through the conduit 25 to the generator 17 and less refrigerant vapor will be expelled in the generator 17. Thus, less refrigerant will flow through the system including the evaporator 5 so that less refrigeration will be produced.

If the temperature in the enclosure 54 continues to fall the spring 99 will continue to act on the bellows 98 to slide the bar 91 further to the left to open the other switch 80 connected in series with the solenoid coil 70 of the other control device 64. Upon de-energization of the solenoid coil 70 of the control device 64 the latter will operate to shut off the supply of fuel to the other burner 67. With no heat supplied to the boiler no steam will be supplied to the generator 17 and the refrigeration system will become inoperative so that no refrigerant will flow through the system.

Upon an increase in temperature in the enclosure 54 the volatile fluid in the bulb 101 will expand and passing through the capillary tube 100 will operate the bellows 98 against the action of the spring 99 to rock the lever 94 in clockwise direction to slide the bar 91 toward the right. Movement of the bar 91 toward the right will sequentially close the switches 80 and 79 and energize the solenoid coils 70 of the control devices 64 and 63 to again supply fuel to the burners 67 and 66. Upon operation of the burners 66 and 67 steam will be generated in the boiler 26 and conducted through the conduit 25 to the generator 17 to expel refrigerant vapor from the absorption solution which, in turn, will be condensed in the condenser 11 and evaporated in the evaporator 5. Thus the refrigeration system is automatically controlled in accordance with the temperature in the enclosure 54 to regulate the flow of refrigerant through the system during operation.

During the operation of the system a condition may occur which will prevent the transfer of a sufficient amount of heat to vaporize all of the refrigerant in the evaporator 5. As a result of the failure of the liquid refrigerant to evaporate it will overflow from the evaporator 5.

Any unevaporated liquid refrigerant occurring in the drain trough 12 of the evaporator 5 will drain through the conduit 123 to the chamber 121. The bulb 118 in the pocket 120 of the chamber 121 will be subjected to the low temperature of the liquid refrigerant flowing therethrough which will reduce the volume of the volatile fluid therein and permit the thermostat element 112 to contract whereupon the spring 119 will rock the operating arm 107 in counterclockwise direction. Upon movement of the operating arm 107 the bifurcation 105 will engage the end of the resilient arm of the switch 76 and disengage it from the fixed contact 103. Opening of the switch 76 opens the circuit to the solenoid coil 70 of the control device 63 whereby to shut off the supply of fuel to one of the burners 66. Thus the amount of steam supplied to the generator 17 from the boiler 26 is reduced to decrease the amount of refrigerant supplied to the evaporator 5. If the shutting off of one of the burners 66 is not sufficient to correct the condition occurring in the evaporator 5, the temperature of the unevaporated liquid refrigerant draining from the evaporator will continue to fall and the bulb 118 being responsive to the temperature of the liquid refrigerant will further reduce the volume of the volatile material so that the spring 119 will continue to actuate the operating member 107 in counterclockwise direction to open the switch 77. Opening of the switch 77 will open the electrical circuit to the solenoid coil 70 of the control device 64 to shut off the fuel to the burner 67. With no fuel supplied to the burners 66 and 67 no steam will be supplied to the generator 17 so that the system will become inoperative. Preferably the thermostat comprising the bulb 118, tube 117 and thermostat element 112 and the operating member 107 are so constructed and arranged as to shut off one burner 66 when the temperature of the unevaporated liquid refrigerant overflowing from the evaporator 5 is at 55° F. and to shut off the other burner 67 when the temperature of the refrigerant falls to 35° F.

If the operating conditions are such that no refrigeration is produced the effect will be noticed in the enclosure 54 and the condition corrected. On the other hand, the control will operate to prevent the waste of liquid refrigerant by slowing down the operation of the refrigeration system and the rate of flow of the refrigerant therethrough so that all of the refrigerant supplied to the evaporator will evaporate therein as it flows therethrough without any overflow into the chamber 121. The bulb 118 in the pocket 120 of the chamber 121 then will be subjected to the temperature of the ambient and expand the volatile fluid therein which, acting through the tube 117, will expand the thermostat element 112 against the action of the spring 119. The operating member 107 will be rocked in a clockwise direction from the position shown in Fig. 2 back to the full line position illustrated in Fig. 1 whereby to permit the switches 76 and 77 to close due to their inherent resiliency. Upon closure of the switches 76 and 77 the solenoid coils 70 of the control devices 63 and 64 will be energized to open the valves to permit the flow of fuel to the burners 66 and 67. The refrigeration system then will operate to supply refrigerant under full load conditions as controlled by the thermostat comprising the bulb 101 and bellows 98.

It will now be observed from the foregoing description that the present invention provides a control for regulating the flow of refrigerant through an absorption refrigeration system in accordance with the requirements in the evaporator. It will still further be observed that the present invention provides a control for reducing the flow of refrigerant through the system when unevaporated liquid refrigerant overflows from the evaporator. It will still further be observed that the present invention provides a control which is responsive to the temperature of the unevaporated liquid refrigerant draining from the evaporator.

While the present invention is shown applied to a particular absorption refrigeration system, it will be understood by those skilled in the art that the control may be applied to other systems and may have a different construction and arrangement of parts without departing from the spirit or scope of the invention. Therefore, without limiting myself in this respect, I claim:

1. In a two-pressure absorption refrigeration system comprising a generator and condenser operable at one pressure and an evaporator and absorber operable at a lower pressure, conduits connecting the elements to provide a closed circuit for the circulation of refrigerant and absorbent and including means for maintaining the difference in pressure between the high and low pressure sides of the system, means for heating the generator, means for regulating the heating means to control the rate of operation of the refrigeration system and the rate of flow of refrigerant therethrough, said evaporator evaporating the refrigerant supplied thereto in accordance with the load, and means directly responsive to surplus refrigerant occurring in the evaporator and connected to operate the regulating means to decrease the heat supplied to the generator and the rate of operation of the refrigeration system.

2. In a continuous absorption refrigeration system comprising a plurality of elements interconnected to provide a closed circuit for the circulation of refrigerant, means for supplying heat to the refrigeration system to expel refrigerant for flow through the system, said system including an evaporator adapted to evaporate the refrigerant flowing therethrough, a path of flow from the evaporator for refrigerant vapor, a separate path of flow from the evaporator for surplus liquid refrigerant overflowing therefrom, means for controlling the heat supplying means to regulate the rate of flow of the refrigerant through the system, and means in the path of flow for surplus refrigerant and responsive only to unevaporated liquid refrigerant overflowing from the evaporator for actuating the control means to decrease the rate of flow of refrigerant through the system.

3. In a continuous absorption refrigeration system comprising a plurality of elements including an evaporator and absorber interconnected to provide a closed circuit for the circulation of refrigerant, said evaporator being so constructed and arranged as to evaporate the refrigerant as it flows therethrough, a conduit connecting the evaporator and absorber, a chamber separate from the conduit for receiving any surplus liquid refrigerant in the evaporator, means for controlling the refrigeration system to decrease the rate of flow of the refrigerant therethrough, and means responsive to any surplus liquid refrigerant flowing from the evaporator to the chamber for actuating the control means to decrease the rate of flow of refrigerant through the system so that all of the refrigerant will be evaporated as it flows through the evaporator.

4. In a continuous absorption refrigeration system comprising a plurality of elements interconnected to provide a closed circuit for the circulation of refrigerant, said system including an evaporator so constructed and arranged as to evaporate the refrigerant as it flows therethrough, a conduit for delivering refrigerant vapor from the evaporator, a drain conduit separate from the vapor conduit for receiving unevaporated liquid refrigerant overflowing from the evaporator, means for controlling the refrigeration system to decrease the rate of flow of refrigerant therethrough, and a thermostat responsive to the temperature of unevaporated liquid refrigerant in the drain conduit as it overflows from the evaporator for actuating the control means.

5. In a continuous absorption refrigeration system comprising a plurality of elements interconnected to provide a closed circuit for the circulation of refrigerant, said system including an evaporator so constructed and arranged as to evaporate the refrigerant as it flows therethrough, said circuit including a conduit connected to the evaporator for conducting refrigerant vapor and a second conduit connected to the evaporator for conducting any unevaporated liquid refrigerant therefrom, means for controlling the refrigeration system to decrease the flow of refrigerant therethrough, and means in the second conduit responsive to the presence of any unevaporated liquid refrigerant overflowing from the evaporator for actuating the control means to decrease the flow of refrigerant through the system.

6. In a continuous absorption refrigeration system comprising a plurality of elements interconnected to provide a closed circuit for the circulation of refrigerant, said system operating in a partial vacuum and utilizing water as a refrigerant, said system including an evaporator so constructed and arranged as to evaporate the refrigerant as it flows therethrough, said circuit including a conduit for conducting refrigerant vapor and a second conduit for conducting unevaporated liquid refrigerant from the evaporator, means for controlling the refrigeration system to decrease the rate of flow of refrigerant therethrough, and a thermostat having an element in the second conduit responsive to a low temperature of unevaporated liquid refrigerant overflowing from the evaporator for actuating the control means to stop the flow of refrigerant through the system to prevent freezing in the evaporator.

7. In a continuous absorption refrigeration system comprising a plurality of elements interconnected to provide a closed circuit for the circulation of refrigerant, said system including an evaporator having structure for directing liquid refrigerant in a tortuous path of flow from one end to the other of the evaporator to promote evaporation, said refrigerant being evaporated while flowing through the evaporator, said circuit having a conduit for conducting unevaporated liquid refrigerant from the evaporator, a heater for supplying heat to the refrigeration system to expel refrigerant for flow through the system, means for controlling the heater in steps to decrease the rate of flow of refrigerant through the system, and a thermostat having a thermal element in the conduit responsive to the temperature of any unevaporated liquid refrigerant overflowing from the evaporator for actuating the control means to decrease the rate of flow of refrigerant through the system, said thermal element being responsive to a low temperature of unevaporated liquid refrigerant to stop the flow of liquid refrigerant through the system.

8. In a continuous absorption refrigeration system comprising a plurality of elements including a generator, a condenser, an evaporator, and an absorber, means interconnecting the elements to provide a closed circuit for the circulation of refrigerant, said evaporator being so constructed and arranged as to evaporate the refrigerant as it flows therethrough, a path of flow from the evaporator for refrigerant vapor, a separate path of flow from the evaporator for any unevaporated liquid refrigerant, means for heating the generator, means for controlling the heating of the generator to decrease the rate of flow of refrigerant through the system, and means in the separate path of flow for surplus refrigerant and responsive only to unevaporated liquid refrigerant overflowing from the evaporator for actuating the control means to decrease the rate of flow of refrigerant through the system.

9. In a continuous absorption refrigeration system comprising a plurality of elements including a generator, a condenser, an evaporator, and an absorber, means interconnecting the elements to provide a closed circuit for the circulation of refrigerant, said evaporator being so constructed and arranged as to evaporate the refrigerant as it flows therethrough, a path of flow from the evaporator for refrigerant vapor, a separate path of flow from the evaporator for any unevaporated liquid refrigerant, means for heating the generator, control means for progressively decreasing the heating of the generator, and a thermostat in the separate path of flow and responsive to the temperature of unevaporated liquid refrigerant overflowing from the evaporator for progressively actuating the control means to decrease the rate of flow of refrigerant through the system until no refrigerant overflows from the evaporator.

10. In a continuous absorption refrigeration system comprising a generator, a condenser, an evaporator and absorber, means interconnecting the elements to provide a closed circuit for circulation of refrigerant, said evaporator being so constructed and arranged as to evaporate the refrigerant as it flows therethrough, means for supplying a heating medium to effect heating of said generator, a valve for regulating the flow of the heating medium, mechanism for operating said valve, a thermostat responsive to the ambient for controlling the valve operating mechanism to regulate the rate of flow of refrigerant through the system, and a thermostat responsive to the temperature of any unevaporated liquid refrigerant overflowing from the evaporator for controlling the valve operating mechanism to decrease the amount of heating medium supplied to the generator.

11. In a continuous absorption refrigeration system comprising a generator, a condenser, an evaporator and absorber, means interconnecting the elements to provide a closed circuit for the circulation of refrigerant, said evaporator being so constructed and arranged as to evaporate the refrigerant as it flows therethrough, means for supplying a heating medium to effect heating of said generator, a plurality of valves for regulating the amount of heating medium supplied to said generator, and mechanism for operating said valves sequentially including a thermostat responsive to the temperature of any unevaporated liquid refrigerant overflowing from the evaporator to progressively decrease the amount of heating medium supplied to the generator.

12. In a continuous absorption refrigeration system comprising a plurality of elements including a generator, a condenser, an evaporator, and an absorber, means interconnecting the elements to provide a closed circuit for the circulation of refrigerant, said evaporator being so constructed and arranged as to evaporate the refrigerant as it flows therethrough, a gas burner to effect heating of the generator, a valve for controlling the flow of gas to the burner, a thermostat responsive to a temperature effected by the evaporator for actuating the control valve, and a thermostat responsive to the temperature of any unevaporated liquid refrigerant overflowing from the evaporator for actuating the control valve to shut off the flow of gas to the burner.

13. In a continuous absorption refrigeration system comprising a plurality of elements including a generator, a condenser, an evaporator, and an absorber, means interconnecting the elements to provide a closed circuit for the circulation of refrigerant, said evaporator being so constructed and arranged as to evaporate the refrigerant as it flows therethrough, a plurality of gas burners to effect heating of the generator, valves for controlling the flow of gas to the burners, and control means for operating the valves sequentially including a thermostat responsive to the temperature of any unevaporated liquid refrigerant overflowing from the evaporator.

14. In a continuous absorption refrigeration system comprising a generator, a condenser, an evaporator, and an absorber, means interconnecting the elements to provide a closed circuit for the circulation of refrigerant, said evaporator being so constructed and arranged as to evaporate the refrigerant as it flows therethrough, a steam boiler, a conduit for conducting steam from the boiler to supply heat to the generator, a plurality of gas burners for the boiler, valves for controlling the flow of gas to the burners, and control means for operating the valves sequentially including a thermostat responsive to the temperature of any unevaporated liquid refrigerant overflowing from the evaporator.

15. In a continuous absorption refrigeration system comprising a plurality of elements interconnected to provide a closed circuit for the circulation of refrigerant, said system including an evaporator adapted to evaporate the refrigerant flowing therethrough, means for regulating the flow of refrigerant through the system including a control device, an electro-magnet for operating the control device, an electric circuit for the electro-magnet, and a thermostat responsive to the temperature of any unevaporated liquid refrigerant overflowing from the evaporator for regulating the electric circuit.

16. In a continuous absorption refrigeration system comprising a plurality of elements interconnected to provide a closed circuit for the circulation of refrigerant, said system including an evaporator adapted to evaporate the refrigerant flowing therethrough, means for regulating the flow of refrigerant through the system including control devices, electro-magnets for operating the control devices, an electric circuit having parallel branches for the electro-magnets, and a thermostat responsive to the temperature of unevaporated liquid refrigerant overflowing from the evaporator for opening the branch circuits for the electro-magnets sequentially.

17. In a continuous absorption refrigeration system comprising a plurality of elements interconnected to provide a closed circuit for the circulation of refrigerant, a heater for supplying heat to operate the refrigeration system, said system including an evaporator adapted to evaporate the refrigerant flowing therethrough, means for controlling the heater to regulate the rate of flow of refrigerant through the system including a thermostat responsive to the ambient to be cooled, and a second thermostat responsive to the temperature of any unevaporated liquid refrigerant overflowing from the evaporator.

18. In a continuous absorption refrigeration system comprising a plurality of elements interconnected to provide a closed circuit for the circulation of refrigerant, said system including an evaporator adapted to evaporate the refrigerant flowing therethrough, means for regulating the flow of refrigerant through the system comprising a plurality of control devices, a thermostat responsive to the ambient to be cooled and connected to operate the control devices sequentially, and a second thermostat responsive to the temperature of any unevaporated liquid refrigerant overflowing from the evaporator and connected to operate the control devices.

19. In a continuous absorption refrigeration system comprising a plurality of elements interconnected to provide a closed circuit for the circulation of refrigerant, said system including an evaporator adapted to evaporate the refrigerant flowing therethrough, means for regulating the flow of refrigerant through the system including control devices, electro-magnets for operating said control devices, electric circuits for the electro-magnets, a thermostat responsive to the ambient to be cooled for opening and closing the electric circuits for said electro-magnets sequentially, and a second thermostat responsive to the temperature of any unevaporated liquid refrigerant overflowing from the evaporator for opening and closing the electric circuits for said electro-magnets sequentially.

20. In a continuous absorption refrigeration system comprising a plurality of elements interconnected to provide a closed circuit for the circulation of refrigerant, said system including an evaporator adapted to evaporate the refrigerant flowing therethrough, means for regulating the flow of refrigerant through the system including control devices, electro-magnets for operating said control devices, an electric circuit having parallel branches for said electro-magnets, switches arranged in series in each of said branch circuits, a thermostat responsive to the temperature of the ambient to be cooled for actuating one set of switches in the plurality of branch circuits sequentially, and a second thermostat responsive to the temperature of any unevaporated liquid refrigerant overflowing from the evaporator for actuating the other set of switches in the plurality of branch circuits sequentially.

21. In a continuous absorption refrigeration system comprising a plurality of elements including a generator, a condenser, an evaporator and an absorber, conduits interconnecting the elements to provide paths of flow for the circulation of refrigerant and absorbent, a heater for heating the generator to expel refrigerant from absorbent for flow through the system, a device for controlling the heater to regulate the amount of heat supplied to the generator, said interconnecting conduits including a vapor conduit connecting the evaporator and absorber and a separate liquid conduit connecting the evaporator and generator for draining unevaporated liquid refrigerant from the evaporator, and a thermostat having a thermal responsive element in the liquid conduit and connected to operate the control device to decrease the amount of heat supplied to the generator when surplus refrigerant overflows from the evaporator through the liquid conduit to the generator.

SVEN W. E. ANDERSSON.

REFERENCES CITED

The following references are of record in the file of this patent:

UNITED STATES PATENTS

| Number | Name | Date |
| --- | --- | --- |
| 2,055,191 | Zellhoefer | Sept. 22, 1936 |
| 2,061,606 | Zellhoefer | Nov. 24, 1936 |
| 2,210,609 | Ullstrand | Aug. 6, 1940 |
| 2,217,303 | Andersson | Oct. 8, 1940 |
| 2,252,791 | Ullstrand | Aug. 19, 1941 |
| 2,272,871 | McGrath | Feb. 10, 1942 |
| 2,296,304 | Wolfert | Sept. 22, 1942 |
| 2,319,601 | Hedlund | May 18, 1943 |
| 2,333,780 | Guernsey | Nov. 9, 1943 |
| 2,345,505 | Siedle | Mar. 28, 1944 |